C. S. WRIGHT.
COMBINATION STUFFING BOX AND CLAMP FOR WIRE LINE PUMPING OUTFITS.
APPLICATION FILED JULY 30, 1913.
1,100,462.
Patented June 16, 1914.
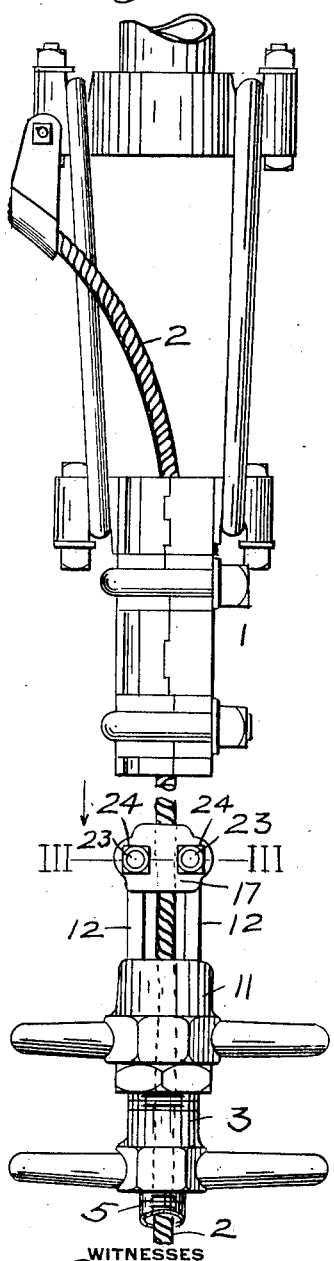
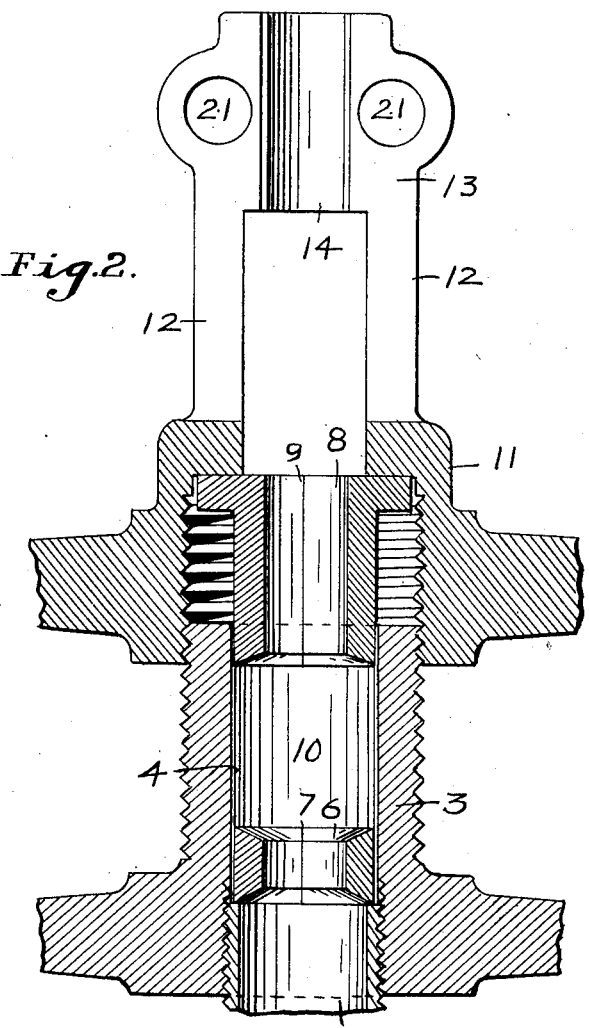
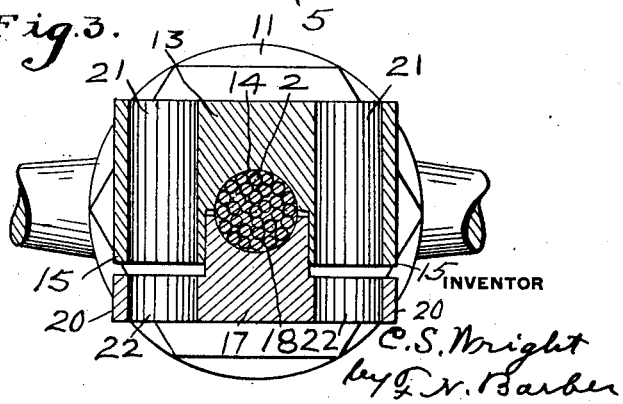

UNITED STATES PATENT OFFICE.

CLYDE S. WRIGHT, OF TOLEDO, OHIO, ASSIGNOR TO THE NATIONAL SUPPLY COMPANY, OF TOLEDO, OHIO, A CORPORATION OF OHIO.

COMBINATION STUFFING-BOX AND CLAMP FOR WIRE-LINE PUMPING OUTFITS.

1,100,462. Specification of Letters Patent. Patented June 16, 1914.

Application filed July 30, 1913. Serial No. 782,122.

*To all whom it may concern:*

Be it known that I, CLYDE S. WRIGHT, a citizen of the United States, residing at Toledo, in the county of Lucas and State of Ohio, have invented new and useful Improvements in Combination Stuffing-Boxes and Clamps for Wire-Line Pumping Outfits, of which the following is a specification.

My invention relates to a combination stuffing-box and clamp, particularly adapted for oil well pumping outfits. Its object is to provide a novel combination stuffing-box and clamp which will not leak and which will allow the wire rope with its leaded end to pass through without cutting the rope.

Referring to the accompanying drawings, Figure 1 is a side view of an apparatus including my invention; Fig. 2, a central vertical section of the stuffing-box, clamp, and polish rod; and Fig. 3, a cross-section on the line III—III, Fig. 1.

On the drawings, 1 represents a clamp for the wire rope 2, the clamp being connected to any means, as a walking beam, for giving the clamp, the rope, and the parts suspended thereon a reciprocatory motion.

3 is the cylindrical packing-box, having a cylindrical bore or opening 4 of uniform diameter. The packing-box 3 has at its lower end internal threads flush with the inner wall thereof, the upper end of the polish rod 5 being screwed into the said threads. The upper end of the polish rod forms an annular seat for the annular packing-seat 6, which is divided into lateral sections or members, 7 indicating on Fig. 2 a line of separation between the sections.

8 is a gland fitting in the upper end of the packing-box 3, the gland being also divided into lateral sections or members, 9 indicating on Fig. 2 a line of separation between the sections.

10 is the space between the packing-seat 6 and the gland 8 to receive packing. The cap 11 screws on threads on the outside of the upper end of the packing-box, its outer end engaging the upper end of the gland 8 and forcing the same down as it is screwed down on the packing-box. The upper end of the cap is provided with a pair of bars 12 connected together at their upper ends by the member 13 of the rope-clamp. This member has a semi-cylindrical vertical groove or rope-seat 14, and the two horizontal ribs or projections 15, one on each side of the groove 14 and both extending toward the open side of the said groove so as to form a guide for the clamping member 17, which has a semi-cylindrical vertical groove or rope-seat 18 facing the groove 14, the wire rope 2 being in the two grooves 14 and 18. The member 17 is provided with lateral projections 20 standing opposite the projections 15. The member 13 and projections 15 are provided with the two openings 21 which register with the two openings 22 in the projections 20 on the member 17 to receive the clamping-bolts 23 provided with the nuts 24.

Normally the wire rope 2 passes through the cap 11, the gland 8, the packing-box 3, the packing-seat 6, and the polish-rod 5, and terminates in the usual enlarged leaded end, not necessary to be shown. By my invention the wire line may be taken out of the usual oil-saver barrel and drawn through the polish rod 5 and the packing-box 3 without cutting off the leaded end of the line, after the cap 11 is screwed off from the stuffing-box. When the cap has been removed, the leaded line can pull the glands, the packing, and the seat 6 out of the packing-box, and the seat and gland can then be taken off from the line. The line can be freed from the clamp by removing the member 17, which can be readily done after the nuts 24 have been screwed off from the bolts 23. The space between the bars 12 is such that the leaded end of the line can drop out between them, since they are separated by a distance at least equal to the internal diameter of the polish-rod 5. As the end of the polish-rod forms a seat for the packing-seat, the latter can be adjusted by turning the polish-rod or the packing-box and cap.

I claim—

1. In a stuffing-box, a packing-box having a uniform cylindrical opening, a polish-rod screwed into the lower end of the packing-box, a packing-seat on the upper end of the polish-rod, a gland in the upper end of the packing-box, and means for adjusting the gland in the packing-box.

2. In a stuffing-box, a packing-box having a uniform cylindrical opening, a polish-rod screwed into the lower end of the packing-box, a packing-seat on the upper end of the polish-rod, a gland in the upper end of the packing-box, and means for adjusting the gland in the packing-box, the packing-seat and gland being divided into lateral sections.

3. The combination of a stuffing-box having a cap, a rope-clamp member supported thereon, said member having a vertical semi-cylindrical groove, a removable clamping member containing a semi-cylindrical groove facing the first groove, and means for drawing the members, one toward the other.

4. The combination of a stuffing-box having a cap on one end and a polish-rod on the other, a pair of bars spaced apart a distance equal to the maximum diameter of an object that can be passed through the polish-rod and packing-box, a rope-clamp member on the top of the bars, having a vertical groove, a removable rope-clamp member having a vertical groove facing the first groove, and means for drawing the members toward each other.

Signed at Toledo, Ohio, this 24 day of July, A. D. 1913.

CLYDE S. WRIGHT.

Witnesses:
R. F. HILL,
M. N. TABER.

---

Copies of this patent may be obtained for five cents each, by addressing the "Commissioner of Patents, Washington, D. C."